United States Patent
Spies

(10) Patent No.: US 7,076,062 B1
(45) Date of Patent: Jul. 11, 2006

(54) METHODS AND ARRANGEMENTS FOR USING A SIGNATURE GENERATING DEVICE FOR ENCRYPTION-BASED AUTHENTICATION

(75) Inventor: Terence R. Spies, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 09/661,049

(22) Filed: Sep. 14, 2000

(51) Int. Cl.
*H04L 9/00* (2006.01)

(52) U.S. Cl. .................. 380/44; 380/28; 380/277; 713/168; 713/176; 713/180

(58) Field of Classification Search ............. 713/170, 713/172, 181, 189, 100, 159, 176; 380/30, 380/277, 278
See application file for complete search history.

(56) References Cited

U.S. PATENT DOCUMENTS

| | | | | |
|---|---|---|---|---|
| 5,689,565 | A * | 11/1997 | Spies et al. | 713/189 |
| 6,079,018 | A * | 6/2000 | Hardy et al. | 713/170 |
| 6,357,004 | B1 * | 3/2002 | Davis | 713/100 |
| 6,453,416 | B1 * | 9/2002 | Epstein | 713/170 |
| 6,484,259 | B1 * | 11/2002 | Barlow | 713/159 |

\* cited by examiner

*Primary Examiner*—Gilberto Barrón, Jr.
*Assistant Examiner*—A. Nobahar
(74) *Attorney, Agent, or Firm*—Lee & Hayes PLLC

(57) ABSTRACT

Methods and arrangements are provided that allow a smart card having digital signing capabilities to support an encryption-based authentication process. In one exemplary method, the smart card is configured to interface with a personal computer. During a set-up process, the personal computer generates a plurality of random values and selectively hashes at least one of the random values. The smart card then digitally signs another one of the random values to produce a corresponding digital signature, for example, using a private key. The personal computer then generates a key based on the digital signature and at least one of the random values, for example, by further hashing the digital signature concatenated with the random number. The resulting key is then used by the personal computer to selectively encrypt data. During a subsequent use, the smart card is required to once again digitally sign the random number to produce a corresponding digital signature. The personal computer then uses the resulting digital signature to compute a key that can be used to decrypt the previously encrypted data.

42 Claims, 3 Drawing Sheets

METHODS AND ARRANGEMENTS FOR USING A SIGNATURE GENERATING DEVICE FOR ENCRYPTION-BASED AUTHENTICATION

TECHNICAL FIELD

This invention relates generally to cryptography and, more particularly, to methods and arrangements that allow signature generating devices to provide encryption-based authentication services within a computing environment.

BACKGROUND

Cryptography is commonly employed to authenticate data, encode data, or encrypt/decrypt data in a manner that allows the data to be stored, accessed and/or transmitted in a controlled/secure manner. Cryptography is becoming more and more popular as computers and networks increase in number, size and complexity.

One basic form of cryptography is asymmetric encryption, which uses public-key encryption algorithms. Public-key algorithms typically employ two different keys (known as a key pair), namely, a public key and a private key. These two keys are typically derived from extremely large prime numbers making them mathematically related. However, it is practically impossible to derive one key from the other. As suggested by their names, the public key is made public, while the private key is kept private. Information (i.e., data) that is encrypted with either one of the keys can only be decrypted with the other one of the keys. Thus, for example, data encrypted with the private key can only be decrypted with the public key, and vice versa.

Since, public-key algorithms can be somewhat slow, particularly when encrypting large amounts of data, a digital signature can be used instead to digitally sign the data. A digital signature can be produced by passing the data through a specific one-way hashing algorithm. The hashing algorithm produces a much smaller message digest. As a result of the hashing algorithm, the message digest is a unique value that can essentially act as a "fingerprint" for the larger data file. Once a message digest is created, it can be encrypted, for example, using the private key and attached to the larger data file when it is sent or otherwise provided.

One problem associated with such cryptography techniques is that a third party might attempt to masquerade as one of the communicating parties, for example, by fraudulently holding out a public key that is represented to be one of the communicating parties public keys. Any messages or hashes that are intended for the communicating party and encrypted with the fraudulent public key could conceivably be decrypted with the accompanying private key by the third party.

To address this problem and others, a digital certificate can be employed by the communicating parties. A digital certificate is a credential issued by a trusted organization or entity called a certification authority (CA), such as, for example, VeriSign, Inc. This credential typically contains a public key and data that identifies the certificate's subject (i.e., the applicable communicating party). A certificate is usually issued by a CA only after the CA has verified the certificate's subject's identity and has confirmed that the public key included with the certificate belongs to that subject. The certificate may also include a digest of the certificate's contents that is signed with the private key of the CA to ensure that the certificate has not been altered or forged.

To further the mobility of users, portable devices, such as, for example, smart cards, can be used to authenticate that a user is allowed to access various resources or information. While some smart cards are configured to provide asymmetric encryption, other smart cards are limited, for example, by export regulations, to only provide digital signatures. In certain situations, therefore, smart cards that are limited to providing digital signatures are unable to support the necessary encryption-based authentication processes. Consequently, there is a need for improved methods and arrangements that can be implemented to allow signature-generating devices to support encryption-based authentication processes.

SUMMARY

The present invention provides improved methods and arrangements that can be implemented to allow signature-generating devices to support encryption-based authentication processes.

In accordance with certain aspects of the present invention, the methods and arrangements allow a signature-generating device to support an encryption-based authentication process. In certain methods, for example, a smart card or like device is configured to interface with a computer. The computer can be configured to generate a key based on a digital signature and at least one random value, for example, by hashing a digital signature produced by the smart card along with a concatenated random number. The resulting key can then be used by the computer to selectively encrypt data. During a subsequent use, for example, the smart card is required to once again digitally sign the random number to produce a corresponding digital signature. The computer then uses the digital signature to compute a key, which is then used to decrypt the previously encrypted data.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
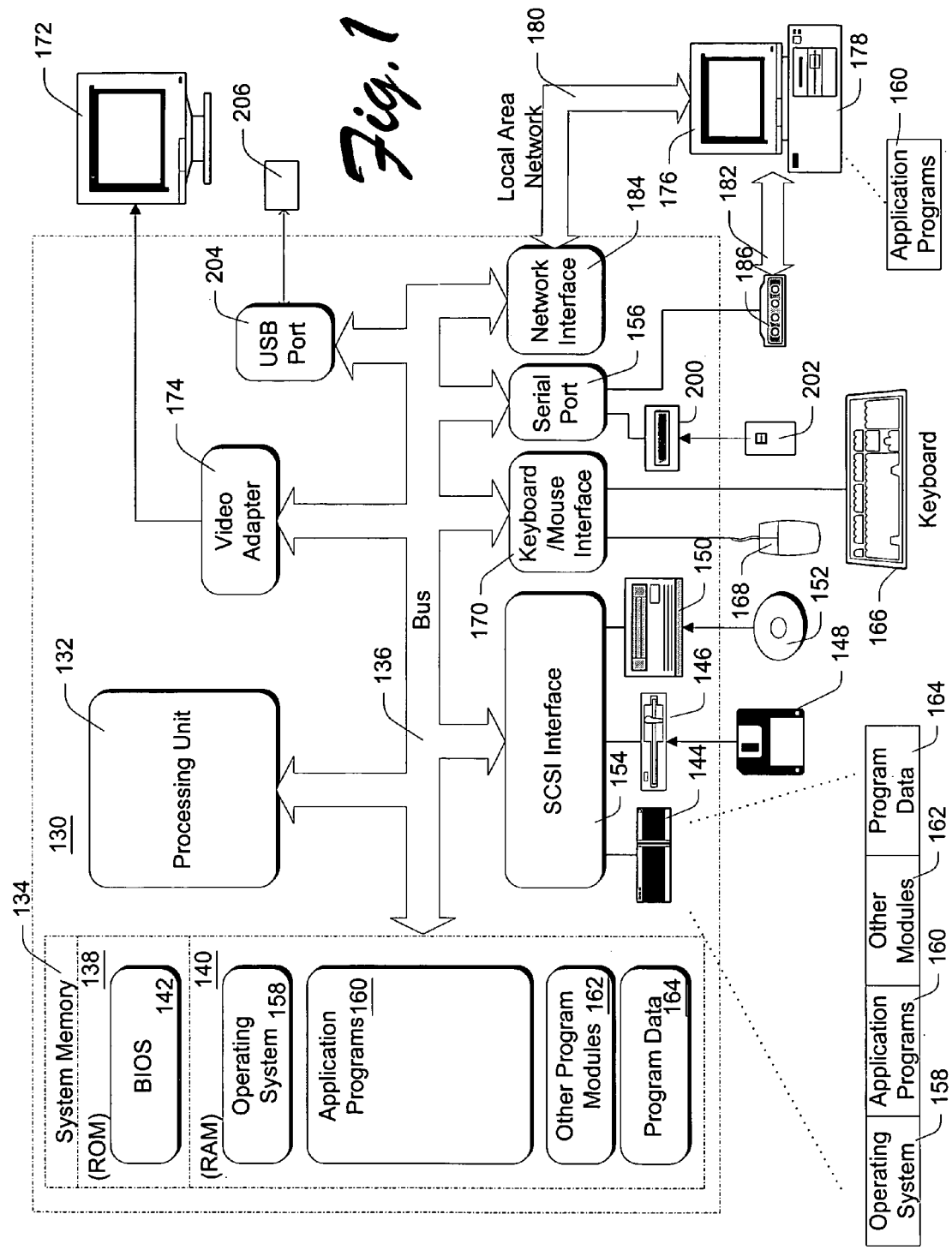
FIG. 1 is a block diagram depicting a computing environment including a computer and a smart card.

FIG. 1 is an illustrative block diagram depicting a general example of a computer 130. Various numbers of computers such as that shown can be used in the context of a distributed computing environment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 8. The logical connections depicted in FIG. 8 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

To support the portability of tokens and the associated cryptographic functions that support application programs 160, computer 130 further includes at least one portable token interface. For example, magnetic disk 148 or optical disk 152 may be considered a token carrier or device when encoded with applicable token data/instructions. More likely, however, in the future, the portable token interface will include the coupling of additional hardware to computer 130. Thus, for example, a smart card reader 200 may be connected to bus 136 through a port such as serial port 156, as depicted. Smart card reader 200 is supported by application programs and/or other modules similar to other input/output devices. Smart card reader 200 is configured to receive a smart card 202 and to provide the operative coupling of smart card 202 to processing unit 132. Smart card reader 200 can support a plurality of smart cards.

By way of still further example, a universal serial bus (USB) port 204 may also be coupled to bus 136, as applicable, to support smart card readers and/or other types of portable token devices 206. The basic notion of the portable token device is that it can be provided by the user to one or more computer systems when required to support cryptographic functions or encryption-based authentication functions.

Figure 2:
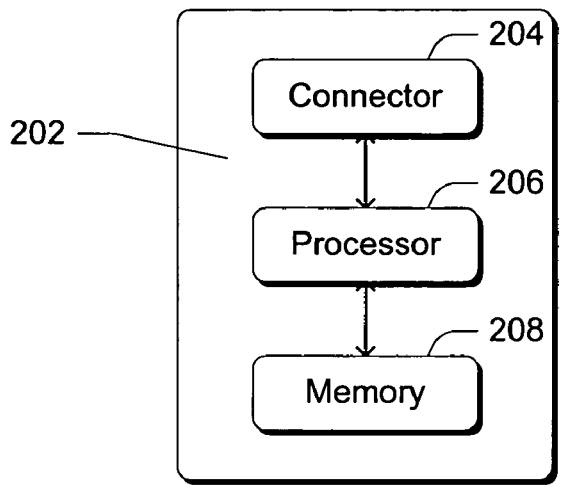
FIG. 2 is a block diagram of an exemplary implementation of a smart card.

FIG. 2 is a block diagram depicting an exemplary smart card 202. As shown, smart card 202 includes a connector 204 coupled to an onboard controller or processor 206. Processor 206 is further coupled to an onboard memory 208. Memory 208 is typically a non-volatile memory that allows smart card 202 to be moved around from machine to machine without loss of data. Processor 206 is responsive to instructions provided via memory 208 and/or computer 130 when smart card 202 is powered on.

Given this configuration, smart cards can be configured to provide significant security for cryptographic keys. Additional security can be provided by requiring the user to enter additional security or identifying data (e.g., a personal identification number (PIN) or string, personal and/or other biometric information/data) in computer 130 when attempting to activate or otherwise access the services provided for by smart card 202. For example, the card holder may be required to enter a PIN to activate the private key, or have their fingerprint scanned. As token carriers, smart card 202 preferably holds at least one asymmetric key pair. In the discussion that follows, it is assumed that smart card 202 is limited to providing a digital signature for an input string, for example, based on an asymmetric key pair therein.

Conventional authentication/logon processes have typically relied on cryptographic techniques to authenticate users. By way of example, a user is usually required to supply a user ID and a "secret" password (PW). The password (PW) or some derivative thereof can then be used to encrypt a key (K) using a conventional encryption function. Key K is a string that is itself used to encrypt a data block D. Data block D can contain any type of data, including logon data, various data files, permissions, etc. Thus, to subsequently access data block D or portions thereof, password PW must be provided and used to first decrypt key K. Once key K has been decrypted, data block D can be decrypted and accessed. The computer would therefore store $E(D)_K$ and $E(K)_{PW}$, wherein E is an encryption function.

Certain logon processes also store and utilize a cryptographic hash H(PW) of password PW. H(PW) is generated by a one-way hashing function. When a user attempts to logon, the newly entered password PW is hashed and the results are compared to the stored H(PW) to authenticate the user. Thus, if the compared hash values match, then $E(K)_{PW}$ is decrypted and then $E(D)_K$ is decrypted. The user then has access to data block D or is otherwise authenticated to access the computing resources.

A smart card that does provide encryption capabilities can be used in place of the $E(K)_{PW}$ operation. For example, a user would provide a user ID and personal identification number (PIN). The PIN can be any string of information, and as such is not limited to numbers as its name infers. The PIN is provided to the smart card and enables the smart card to perform generate key K, which can then be used to decrypt $E(D)_K$.

However, certain smart card implementations are limited to only generating digital signatures of an input string. As such, these signature-generating devices are unable to generate key K, as defined above. As described below, such limitations can prevent users from accessing the computer in certain situations.

Let us assume that the user is attempting to logon to a computer network through a remote computer having a smart card reader, and that the user wants to access data on the remote computer. In this example, the computer network includes a domain controller or like arrangement that authenticates users that can access various resources including the remote computer.

When the remote computer is operatively connected to the domain controller, the domain controller sends a challenge (C) to the remote computer as part of the logon process. The remote computer responds with a signature S(C) of challenge C generated by the smart card and a digital certificate. The domain controller then responds with decrypted data block (or at least a portion thereof associated with the logon process), upon authentication of the signature S(C) and the digital certificate.

However, if the remote computer is not operatively connected to the domain controller, then the user would not be able to logon using a smart card that is limited to generating signatures.

Thus, as mentioned above there is a need for improved methods and arrangements that allow signature-generating devices to support encryption-based authentication processes, such as, for example, a logon process.

The novel methods and arrangements described herein are capable of turning a signature generating operation into an encryption operation that can be used to derive a key K for use in the encryption and decryption processes.

Figure 3:
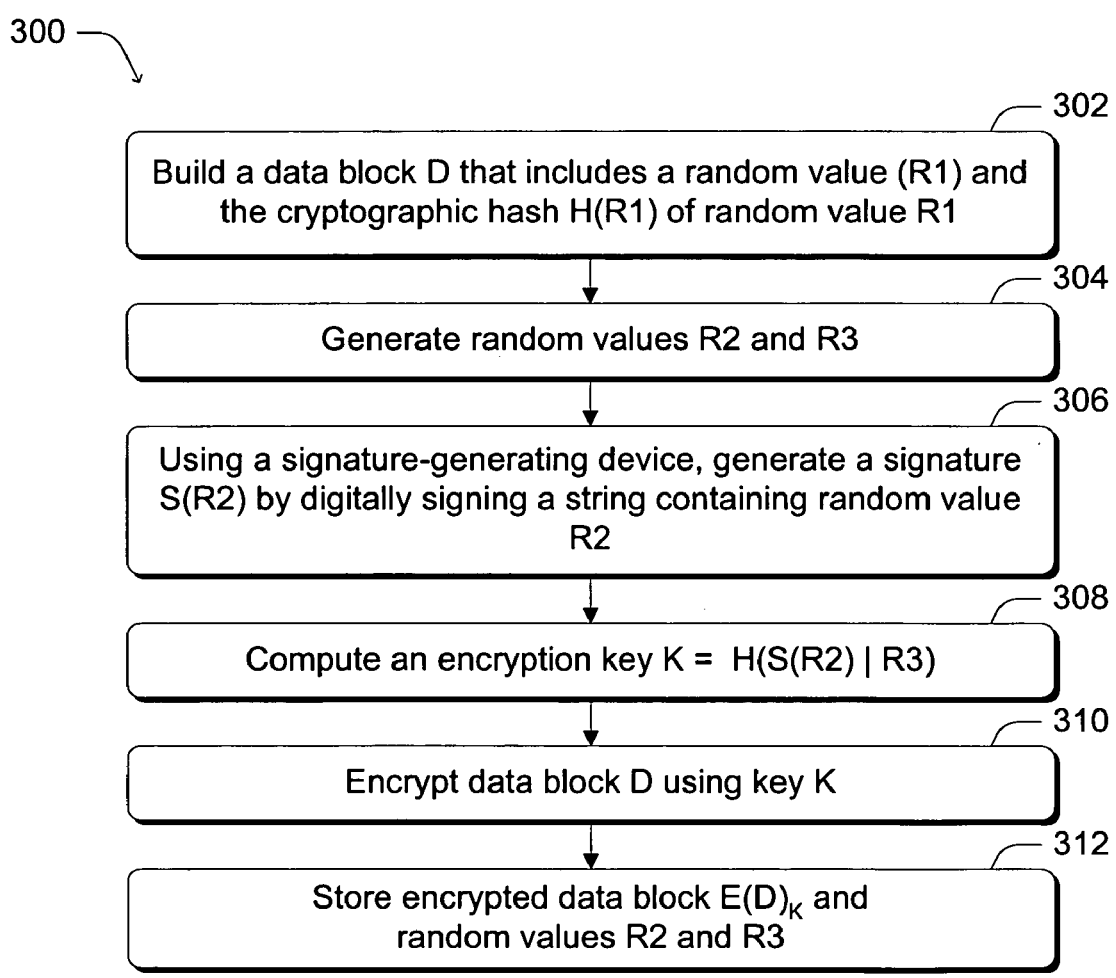
FIG. 3 is a flow-chart depicting an exemplary initial set-up process.

FIG. 3 is a block diagram depicting an initial process 300 for initially setting up the various methods and arrangements and encrypting data. In step 302, a computer generates a random value (R1), computes a cryptographic hash H(R1) of random number R1 and builds a data block (D) that includes random value R1 and hash H(R1). In step 304, the computer generates additional random values (R2) and (R3). In step 306, the computer provides a string that includes random value R2 to the smart card. In response, the smart card digitally signs the string and returns a signature S(R2) to the computer. Since S(R2) is the output of a private key operation, not all of the bits will be uniformly random. Consequently, in this example, random value R3 is used to further increase the security of the overall encryption process. Thus, in step 308, the computer computes an encryption key (K) by cryptographically hashing S(R2) combined with random value R3 (e.g., K H(S(R2)|R3), or K=H(R3|S(R2))). In step 310, the resulting key K is then used to encrypt data block D. In step 312, the computer stores encrypted data block $E(D)_K$, and random values R2 and R3.

In the logon example above, the remote computer will have encrypted data block $E(D)_K$, and stored random values R2 and R3. Thus, during a logon process, when logon information within data block D is required, the signature-generating smart card will be able to support the decryption process.

Figure 4:
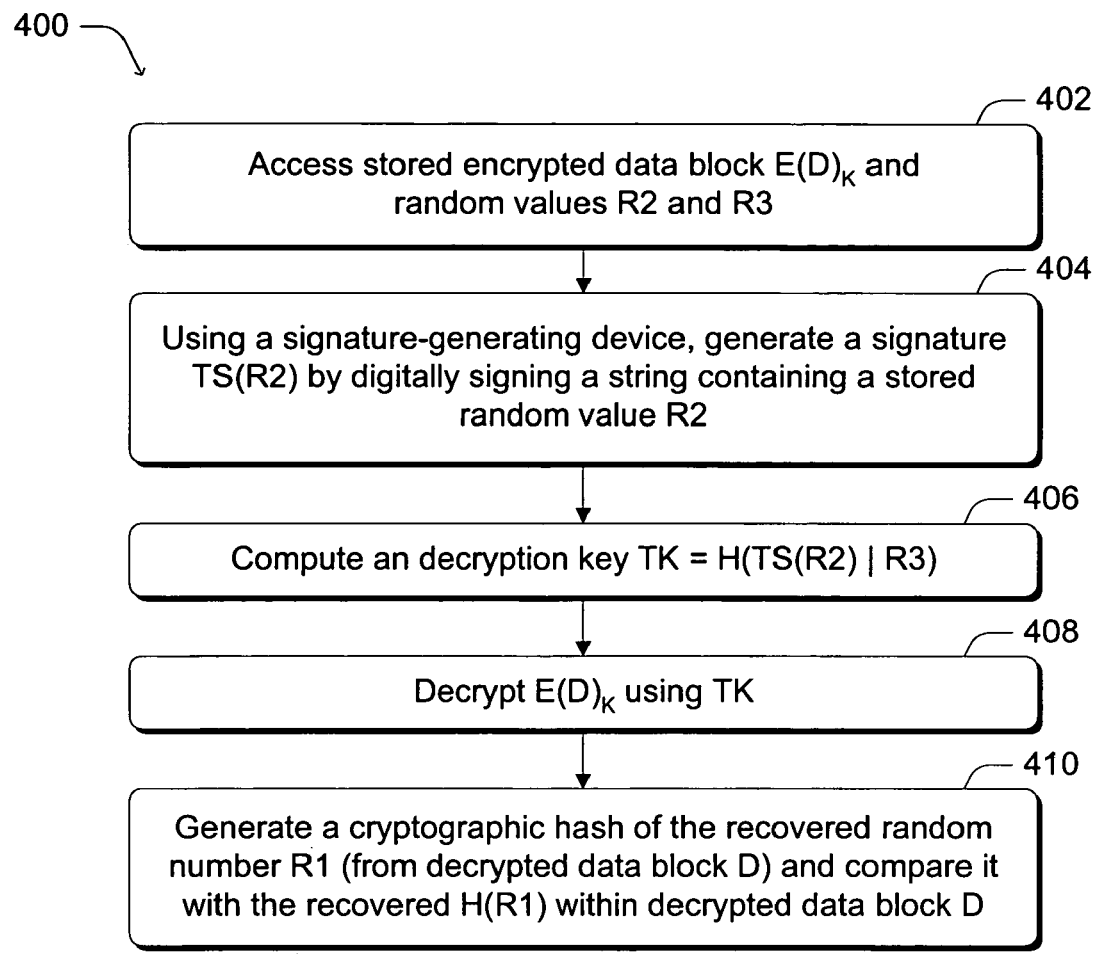
FIG. 4 is a flow-chart depicting an exemplary authentication process.

FIG. 4 is a flow-chart depicting a decryption process 400. In step 402, the computer accesses the encrypted data block $E(D)_K$, and stored random values R2 and R3. In step 404, the computer provides a string including random value R2 to the signature-generating smart card. In response, the smart card digitally signs the string and returns a signature TS(R2) to the computer. In step 406, the computer computes a decryption key (TK) by cryptographically hashing TS(R2) combined with random value R3 (e.g., K=H(TS(R2)|R3), or K=H(R3|TS(R2))). In step 408, the resulting key TK is then used to decrypt data block $E(D)_K$ and thereby reproduce data block D.

Step 410, which is optional, provides additional security checking by having the computer further generate a cryptographic hash of the decrypted random value R1 that was included in data block D. The resulting hash value is then compared to decrypted hash value H(R1). A match further verifies that key TK was the correct key.

In accordance with still other exemplary implementations, a simpler method having reduced security is provided that does not require as many random values. Here, the Encryption Key=HASH(Signature(R1),R2) is instead Encryption Key=Signature(R1), or Encryption Key=some other derivative of (Signature(R1)). This is like to picking the first/last N bits from the signature itself.

Similarly, there's no reason other than verification to have redundancy in the encrypted packet. In certain implementations described above, the Encrypted Packet=Encrypted (R3, Hash(R3)), such that if any bit of the encrypted packet is altered, one will know since the R3<-> Hash(R3) link would go bad. Similarly, a failure would occur if the decryption is attempted with the wrong key.

However, a simpler implementation may be employed in certain situations. For example, an Encrypted Packet=Encrypted(R3) or an Encrypted Packet=Encrypted (User Data) may be employed, so as to forego the extra security checking and/or encrypt the user data directly. One drawback, of course, to this simpler approach is that the added security of the R3<-> Hash(R3) link would be missing. Nevertheless, this may be appropriate for certain arrangements.

Using the above methods and arrangements, therefore, a signature-generating smart card or other like device is able to support encryption-based authentication processes within a computer and/or computer network environment. For example, the methods and arrangements allow users to logon and access encrypted data through portable computers that are intermittently connected to an enterprise network, without requiring a smart card that supports more advanced encryption processes.

For further information on cryptography techniques, readers are directed to available texts, such as, for example, *Applied Cryptography Second Edition*, by Bruce Schneier, published by John Wiley & Sons, Inc., 1996, which is incorporated herein by reference and for all purposes. Those skilled in the art will further recognize that the above methods and arrangements may be adapted for use in enforcing cached logons in a significantly secure manner. For example, the above exemplary methods can be used to complete the client-side of an encryption-based authentication round as described above and may also be used to have a signature-based smart card or like device generate a key that unlocks secrets (i.e., data) that are held encrypted locally. Without this mechanism it isn't clear how such a "signature-only" device could possibly be used to encrypt a local cache securely.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method, at least partially implemented by a computer, comprising:
   building a data block comprising a first random value and a cryptographic hash of the first random value;
   generating, on a second computing device, a signature by digitally signing a string containing a second random value; and
   computing an encryption key, for encrypting the data block, by hashing a combination of the signature and a third random value.

2. The method as recited in claim 1, wherein the second computing device is a smart card.

3. The method as recited in claim 1, wherein the combination of the digitally signed string and the third random value comprises the digitally signed string concatenated to the third random value.

4. The method as recited in claim 1, wherein the combination of the digitally signed string and the third random value comprises the third random value concatenated to the digitally signed string.

5. The method as recited in claim 1, further comprising:
   encrypting the data block using the encryption key; and
   storing the encrypted data block and the second and third random values.

6. The method as recited in claim 5, further comprising:
   accessing the stored encrypted data block and the second and third random values;
   providing a string containing the second random value to the second computing device; and
   generating, on the second computing device, a second signature by digitally signing the string containing the second random value.

7. The method as recited in claim 6, further comprising:
   computing a decryption key using the second signature and the third random value;
   decrypting the encrypted data block with the decryption key; and
   comparing the decryption of the encrypted data block to the data block.

8. The method as recited in claim 7, wherein computing the decryption key comprises:
   hashing the second signature concatenated to the third random value.

9. The method as recited in claim 7, further comprising:
   hashing the first random value contained within the decryption of the encrypted data block; and
   comparing the result of this hash with the hash of the first random value contained within the decryption of the encrypted data block.

10. A method, at least partially implemented by a computer, comprising:
    accessing an encrypted data block, wherein the encrypted data block comprises an encryption of a combination of a first random value and a hash of the first random value;
    accessing second and third random values;
    providing a string containing the second random value to a second computing device;
    generating, on the second computing device, a signature by digitally signing the string containing the second random value; and
    computing a decryption key, configured to decrypt the encrypted data block, wherein computing the decryption key uses the signature generated on the second computing device and the third random value.

11. The method as recited in claims 10, wherein the second computing device is a smart card.

12. The method as recited in claim 10, wherein computing the decryption key comprises:
    hashing the signature concatenated to the third random value.

13. The method as recited in claim 10, further comprising:
    decrypting the encrypted data block with the decryption key, wherein the first random value and the hash of the first random value are recovered by the decryption; and
    comparing the first random value and the hash of the first random value recovered from the decryption to a data block from which the encrypted data block was generated.

14. The method as recited in claim 13, further comprising:
    hashing the first random value recovered from the decryption of the is encrypted data block; and
    comparing the result of this hash with the hash of the first random value recovered from the decryption of the encrypted data block.

15. One or more computer-readable media comprising computer-executable instructions for encryption-based authentication, the computer-executable instructions comprising instructions for:
    building a data block comprising a first random value and a cryptographic hash of the first random value;
    generating, on a second computing device, a signature by digitally signing a string containing a second random value; and computing an encryption key, for encrypting the data block, by hashing a combination of the signature and a third random value.

16. The one or more computer-readable media as recited in claim 15, wherein the second computing device is a smart card.

17. The one or more computer-readable media as recited in claim 15, wherein the combination of the digitally signed string and the third random value comprises the digitally signed string concatenated to the third random value.

18. The one or more computer-readable media as recited in claim 15, wherein the combination of the digitally signed string and the third random value comprises the third random value concatenated to the digitally signed string.

19. The one or more computer-readable media as recited in claim 15, further comprising instructions for:
   encrypting the data block using the encryption key; and
   storing the encrypted data block and the second and third random values.

20. The one or more computer-readable media as recited in claim 19, further comprising instructions for:
   accessing the stored encrypted data block and the second and third random values;
   providing a string containing the second random value to the second computing device; and
   generating, on the second computing device, a second signature by digitally signing the string containing the second random value.

21. The one or more computer-readable media as recited in claim 20, further comprising instructions for:
   computing a decryption key using the second signature and the third random value;
   decrypting the encrypted data block with the decryption key; and
   comparing the decryption of the encrypted data block to the data block.

22. The one or more computer-readable media as recited in claim 21, wherein computing the decryption key comprises instructions for:
   hashing the second signature concatenated to the third random value.

23. The one or more computer-readable media as recited in claim 21, further comprising instructions for:
   hashing the first random value contained within the decryption of the encrypted data block; and
   comparing the result of this hash with the hash of the first random value contained within the decryption of the encrypted data block.

24. One or more computer-readable media comprising computer-executable instructions for encryption-based authentication, the computer-executable instructions comprising instructions for:
   accessing an encrypted data block, wherein the encrypted data block comprises an encryption of a combination of a first random value and a hash of the first random value;
   accessing second and third random values;
   providing a string containing the second random value to a second computing device;
   generating, on the second computing device, a signature by digitally signing the string containing the second random value; and
   computing a decryption key, configured to decrypt the encrypted data block, wherein computing the decryption key uses the signature generated on the second computing device and the third random value.

25. The one or more computer-readable media as recited in claim 24, wherein the second computing device is a smart card.

26. The one or more computer-readable media as recited in claim 24, wherein computing the decryption key comprises instructions for:
   hashing the signature concatenated to the third random value.

27. The one or more computer-readable media as recited in claim 24, further comprising instructions for:
   decrypting the encrypted data block with the decryption key, wherein the first random value and the hash of the first random value are recovered by the decryption; and
   comparing the first random value and the hash of the first random value recovered from the decryption to a data block from which the encrypted data block was generated.

28. The one or more computer-readable media as recited in claim 27, further comprising instructions for:
   hashing the first random value recovered from the decryption of the encrypted data block; and
   comparing the result of this hash with the hash of the first random value recovered from the decryption of the encrypted data block.

29. A system configured for encryption-based authentication, comprising:
   means for building a data block comprising a first random value and a cryptographic hash of the first random value;
   means for generating, on a second computing device, a signature by digitally signing a string containing a second random value; and
   means for computing an encryption key, for encrypting the data block, by hashing a combination of the signature and a third random value.

30. The system as recited in claim 29, wherein the second computing device is a smart card.

31. The system as recited in claim 29, wherein the combination of the digitally signed string and the third random value comprises the digitally signed string concatenated to the third random value.

32. The system as recited in claim 29, wherein the combination of the digitally signed string and the third random value comprises the third random value concatenated to the digitally signed string.

33. The one or more computer-readable media as recited in claim 29, further comprising:
   means for encrypting the data block using the encryption key; and
   means for storing the encrypted data block and the second and third random values.

34. The system as recited in claim 33, further comprising:
   means for accessing the stored encrypted data block and the second and third random values;
   means for providing a string containing the second random value to the second computing device; and
   means for generating, on the second computing device, a second signature by digitally signing the string containing the second random value.

35. The system as recited in claim 34, further comprising:
   means for computing a decryption key using the second signature and the third random value;
   means for decrypting the encrypted data block with the decryption key; and
   means for comparing the decryption of the encrypted data block to the data block.

36. The system as recited in claim 35, wherein computing the decryption key comprises:
- means for hashing the second signature concatenated to the third random value.

37. The system as recited in claim 35, further comprising:
- means for hashing the first random value contained within the decryption of the encrypted data block; and
- means for comparing the result of this hash with the hash of the first random value contained within the decryption of the encrypted data block.

38. A system configured for encryption-based authentication, comprising:
- means for accessing an encrypted data block, wherein the encrypted data block comprises an encryption of a combination of a first random value and a hash of the first random value;
- means for accessing second and third random values;
- means for providing a string containing the second random value to a second computing device;
- means for generating, on the second computing device, a signature by digitally signing the string containing the second random value; and
- means for computing a decryption key, configured to decrypt the encrypted data block, wherein computing the decryption key uses the signature generated on the second computing device and the third random value.

39. The system media as recited in claim 38, wherein the second computing device is a smart card.

40. The system as recited in claim 38, wherein computing the decryption key comprises:
- means for hashing the signature concatenated to the third random value.

41. The system as recited in claim 38, further comprising:
- means for decrypting the encrypted data block with the decryption key, wherein the first random value and the hash of the first random value are recovered by the decryption; and
- means for comparing the first random value and the hash of the first random value recovered from the decryption to a data block from which the encrypted data block was generated.

42. The system as recited in claim 41, further comprising:
- means for hashing the first random value recovered from the decryption of the encrypted data block; and
- means for comparing the result of this hash with the hash of the first random value recovered from the decryption of the encrypted data block.

* * * * *